United States Patent [19]

Zboril et al.

[11] Patent Number: 5,589,555
[45] Date of Patent: *Dec. 31, 1996

[54] CONTROL OF A SOLUTION PROCESS FOR POLYMERIZATION OF ETHYLENE

[75] Inventors: Vaclav G. Zboril, Kingston; Stephen J. Brown, Elginburg, both of Canada

[73] Assignee: Novacor Chemicals (International) S.A., Fribourg, Switzerland

[*] Notice: The term of this patent shall not extend beyond the expiration date of Pat. No. 5,579,098.

[21] Appl. No.: 499,646

[22] Filed: Jul. 7, 1995

Related U.S. Application Data

[63] Continuation of Ser. No. 70,369, Jun. 3, 1993, abandoned.

[30] Foreign Application Priority Data

Oct. 3, 1991 [GB] United Kingdom ............... 9120971

[51] Int. Cl.$^6$ ...................................... C08F 4/654
[52] U.S. Cl. ............... 526/64; 526/65; 526/116; 526/124.7; 526/124.9; 526/125.2; 526/125.7; 526/142; 526/153; 502/110; 502/115
[58] Field of Search ............ 526/64, 65, 124.7, 526/124.9, 142, 153, 125.2, 116, 125.7

[56] References Cited

U.S. PATENT DOCUMENTS

| | | | |
|---|---|---|---|
| 4,098,974 | 7/1978 | Klaassen | 526/65 |
| 4,250,288 | 2/1981 | Lowery, Jr. et al. | 526/137 |
| 4,330,647 | 5/1982 | Sakurai et al. | 526/65 |
| 4,399,055 | 8/1983 | Matsuura et al. | 252/429 B |
| 4,414,369 | 11/1983 | Kuroda et al. | 526/65 |
| 4,431,784 | 2/1984 | Hamilton et al. | 526/116 |
| 4,547,475 | 10/1985 | Glass et al. | 502/115 |
| 4,681,924 | 7/1987 | Harris et al. | 526/125 |
| 4,704,376 | 11/1987 | Blenkers et al. | 502/104 |
| 5,013,701 | 5/1991 | Coosmans et al. | 502/110 |
| 5,254,517 | 10/1993 | Shamsoum et al. | 502/110 |
| 5,519,098 | 5/1996 | Zboril et al. | 526/116 |

*Primary Examiner*—Romulo H. Delmendo
*Attorney, Agent, or Firm*—Kenneth H. Johnson

[57] ABSTRACT

A solution process for the preparation of high molecular weight polymers of alpha-olefins selected from the group consisting of homopolymers of ethylene and copolymers of ethylene and $C_3$–$C_{12}$ higher alpha-olefins is disclosed. Ethylene and/or mixtures of ethylene and $C_3$–$C_{12}$ higher alpha-olefins are polymerized under non-isothermal conditions in a tubular reactor or in a system of reactors which operate under different conditions, in the presence of a catalytic amount of a titanium-containing coordination catalyst in an inert solvent at a temperature in excess of 105° C. The improvement is characterized in that:

(a) the catalyst is activated with a solution of a mixture of aluminum alkyl and alkoxy aluminum alkyl in inert solvent; and (b) the process is controlled by adjusting the ratio of aluminum alkyl to alkoxy aluminum alkyl in the mixture of (a). The aluminum alkyl is of the formula $AlR_nX_{3-n}$ and the alkoxy aluminum alkyl is of the formula $AlR'_mOR''_{3-m}$, in which each of R, R' and R'' is alkyl or aryl of 1–20 carbon atoms, X is halogen, n is 2–3 and m is 0–3.

1 Claim, No Drawings

CONTROL OF A SOLUTION PROCESS FOR POLYMERIZATION OF ETHYLENE

This is a continuation of application Ser. No. 08/070,369 filed on Jun. 3, 1993, now abandoned.

The present invention relates to a solution process and catalyst for the preparation of polymers of ethylene, especially homopolymers of ethylene and copolymers of ethylene and higher alpha-olefins. In particular, the invention relates to a method of control of a solution polymerization process for the preparation of such polymers in which the catalyst used in the process is activated with a mixture of an aluminum alkyl and an alkoxy aluminum alkyl compound, the ratio in the mixture being used in the control of the process.

Polymers of ethylene, for example, homopolymers of ethylene and copolymers of ethylene and higher alpha-olefins, are used in large volumes for a wide variety of end-uses, for example, in the form of film, fibres, moulded or thermoformed articles, pipe coating and the like.

There are two types of processes for the manufacture of polyethylene that involve the polymerization of monomers in an inert liquid medium in the presence of a coordination catalyst viz. those which operate at temperatures below the melting or solubilization temperature of the polymer and those which operate at temperatures above the melting or solubilization temperature of the polymer. The latter are referred to as "solution" processes, an example of which is described in Canadian Patent 660,869 of A.W. Anderson, E. L. Fallwell and J. M. Bruce, which issued 1963 Apr. 9. In a solution process, the process is operated so that both the monomer and polymer are soluble in the reaction medium. Accurate control over the degree of polymerization, and hence the molecular weight and molecular weight distribution of the polymer obtained, may be achieved by control of the temperature conversion in the reactor system.

The molecular weight distribution of the polymer made by a solution process is advantageously controlled by preparing the polymer in at least two reactors which are operated under different conditions, most frequently at different temperatures. These conditions determine the molecular weight of the polymer fractions that are produced. The relative amounts of the different fractions is controlled by adjusting the conversion in each of the reactors. The conversion is controlled either by adjusting the catalyst type and concentration in each reactor, which requires as many catalyst systems as there are reactors, or by adjusting the reactor holdup time. Either of the control strategies tends to be complicated and costly.

It has now unexpectedly been found that alkyl aluminum and alkoxy aluminum alkyls have significantly different responses to changes in temperature when used as activators in a solution polymerization process, and that such differences may be exploited to provide a relatively simple method of controlling a multi-reactor or tubular reactor system.

Accordingly, the present invention provides in a solution process for the preparation of high molecular weight polymers of alpha-olefins selected from the group consisting of homopolymers of ethylene and copolymers of ethylene and $C_3$–$C_{12}$ higher alpha-olefins, by polymerization of ethylene and/or mixtures of ethylene and $C_3$–$C_{12}$ higher alpha-olefins under non-isothermal conditions in a tubular reactor or in a system of reactors which operate under different conditions, in the presence of a catalytic amount of a titanium-containing coordination catalyst in an inert solvent at a temperature in excess of 105° C., the improvement characterized in that:

(a) activating the catalyst with a solution of a mixture of aluminum alkyl and alkoxy aluminum alkyl in inert solvent; and (b) controlling said process by adjusting the ratio of aluminum alkyl to alkoxy aluminum alkyl in the mixture of (a);

said aluminum alkyl being of the formula $AlR_nX_{3-n}$ and said alkoxy aluminum alkyl being of the formula $AlR'_mOR''_{3-m}$, in which each R, R' and R" is independently selected from alkyl or aryl of 1–20 carbon atoms, X is halogen, n is 2–3 and m is 0–3.

The present invention further provides a solution process for the preparation of high molecular weight polymers of alpha-olefins selected from the group consisting of homopolymers of ethylene and copolymers of ethylene and $C_3$–$C_{12}$ higher alpha-olefins, said process comprising feeding monomer selected from the group consisting of ethylene and mixtures of ethylene and at least one $C_3$–$C_{12}$ higher alpha-olefin, a coordination catalyst and inert hydrocarbon solvent to a reactor, polymerizing said monomer under non-isothermal conditions in a tubular reactor or in a system of reactors which operate under different conditions, at a temperature in the range of 105°–320° C. and recovering the polymer so obtained, characterized in that said coordination catalyst is been formed from a first component and a second component, said first component containing titanium and said second component being a mixture of aluminum alkyl and alkoxy aluminum alkyl, in which the control of said process includes adjusting the ratio of alkyl aluminum to alkoxy aluminum alkyl, said aluminum alkyl being of the formula $AlR_nX_{3-n}$ and said alkoxy aluminum alkyl being of the formula $AlR'_mOR''_{3-m}$, in which each R, R' and R" is independently selected from alkyl or aryl of 1–20 carbon atoms, X is halogen, n is 2–3 and m is 0–3.

In a preferred embodiment of the processes of the invention, R is alkyl of 2–8 carbon atoms and n=3, and each of R' and R" is alkyl of 2–8 carbon atoms and m=2.

In an embodiment of the process of the invention, the second component is in the form of a mixture of trialkyl aluminum and an alcohol in which the amount of alcohol is less than the stoichiometric amount to form dialkyl alkoxy aluminum, especially in which the trialkyl aluminum is $AlR^3_3$ in which $R^3$ is an alkyl group having 1–10 carbon atoms and the alcohol is of the formula $R^4OH$ in which $R^4$ is alkyl or aryl of 1–20 carbon atoms, especially alkyl of 1–16 carbon atoms.

In another embodiment of the process, the first component is formed from:

(i) a mixture of $MgR^1_2$ and $AlR^2_3$ in which each $R^1$ and $R^2$ are the same or different and each is independently selected from alkyl groups having 1–10 carbon atoms;

(ii) a reactive chloride component; and (iii) titanium tetrachloride.

Alternatively, the first component may be formed by combining solutions of titanium tetrahalide, optionally containing vanadium oxytrihalide, with organoaluminum compound e.g. trialkyl aluminum or dialkyl aluminum halide, at a temperature of less than 30° C., heating the resultant admixture to a temperature of 150–300° C. for a period of 5 seconds to 60 minutes; the preferred halide is chloride.

In a further embodiment, the forming of the first and second catalyst components and the admixing thereof are carried out in-line at a temperature of less than 30° C.

The present invention is directed to a process for the preparation of high molecular weight polymers of alpha-olefins, such polymers being intended for fabrication into articles by extrusion, injection moulding, thermoforming, rotational moulding and the like. In particular, the polymers of alpha-olefins are homopolymers of ethylene and copolymers of ethylene and higher alpha-olefins i.e. alpha-olefins of the ethylene series, especially such higher alpha-olefins having 3 to 12 carbon atoms i.e. $C_3$–$C_{12}$ alpha-olefins, examples of which are 1-butene, 1-hexene and 1-octene. The preferred higher alpha-olefins have 4–10 carbon atoms. In addition cyclic endomethylenic dienes may be fed to the process with the ethylene or mixtures of ethylene and $C_3$–$C_{12}$ alpha-olefin. Such polymers are known.

In the process of the present invention, monomer, a coordination catalyst and inert hydrocarbon solvent, and optionally hydrogen, are fed to a reactor system. The monomer may be ethylene or mixtures of ethylene and at least one $C_3$–$C_{12}$ higher alpha-olefin, preferably ethylene or mixtures of ethylene and at least one $C_4$–$C_{10}$ higher alpha-olefin; it will be understood that the alpha-olefins are hydrocarbons.

The coordination catalyst is formed from two components viz. a first component and a second component. The first component contains titanium or admixtures thereof with other transition metals in lower than maximum valency, and is an organometallic component of the type typically used in solution polymerization processes. The first component may be in a solid form. Examples of the first component have been given above.

The second component is a solution of a mixture of aluminum alkyl and alkoxy aluminum alkyl in inert solvent, the ratio of aluminum alkyl to alkoxy aluminum alkyl in the mixture being used in the control of the process. In the mixture, the aluminum alkyl is of the formula $AlR_nX_{3-n}$ and the alkoxy aluminum alkyl is of the formula $AlR'_mOR''_{3-m}$, in which each R, R' and R'' is independently selected from alkyl or aryl of 1–20 carbon atoms, X is halogen especially fluorine, chlorine and bromine, n is 2–3 and m is 0–3. The preferred halogen is chlorine.

The alkoxy aluminum alkyl may be prepared by admixing the corresponding alkyl aluminum with the corresponding alcohol, so as to form the alkoxy aluminum alkyl. Preferably, the alkyl aluminum is the same as the aluminum alkyl in the second component. In fact, the preferred method of forming the second component is to add the alcohol to the alkyl aluminum in less than the stoichiometric amount required to convert all of the alkyl aluminum to alkoxy aluminum alkyl. The mixing may be conveniently carried out in-line at a temperature of less than 30° C., permitting reaction to occur for some minimum time. This time depends on the type and reactivity of the components used to prepare a particular catalyst. As exemplified hereinafter, feeding the alcohol directly to the reactor in the polymerization process is detrimental to the polymerization process.

The ratio of the alcohol to the alkyl aluminum used to achieve control of the desired distribution of temperature and/or conversion in the reactor system is in the range of 0.1–1 (alcohol:aluminum). Alternatively, this ratio may be adjusted to match the catalyst activity to the polymerization conditions e.g. temperature and hold-up time, to obtain the desired performance of the catalyst in the reactor system.

The concentration of the components of the solutions used in the preparation of the catalyst is not critical and is primarily governed by practical considerations. Concentrations of as low as 25 ppm, on a weight basis, may be used but higher concentrations, for example 100 ppm and above, are preferred.

As exemplified hereinafter, the sequence of steps in the preparation of the catalyst is important in obtaining a catalyst with high activity.

The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process.

The coordination catalyst described herein is used in the process of the present invention without separation of any of the components of the catalyst. In particular, neither liquid nor solid fractions are separated from the catalyst before it is fed to the reactor. In addition, the catalyst and its components are not slurries. All the components are easy-to-handle, storage stable liquids.

The first component of the catalyst described herein may be used, according to the process of the present invention, over the wide range of temperatures that may be used in an alpha-olefin polymerization process operated under solution conditions. For example such polymerization temperatures may be in the range of 105°–320° C. and especially in the range of 105°–310° C. However, the activator is particularly effective at controlling a solution polymerization process which is operated in a reactor system in which the polymerization is carried out at various temperatures, as in a tubular reactor or multi-reactor system.

The pressures used in the process of the present invention are those known for solution polymerization processes, for example, pressures in the range of about 4–20 MPa.

In the process of the present invention, the alpha-olefin monomers are polymerized in the reactor in the presence of the catalyst. Pressure and temperature are controlled so that the polymer formed remains in solution.

Small amounts of hydrogen, for example 1–40 parts per million by weight, based on the total solution fed to the reactor may be added to one or more of the feed streams of the reactor system in order to improve control of the melt index and/or molecular weight distribution and thus aid in the production of a more uniform product, as is disclosed in Canadian Patent 703,704.

The solution passing from the polymerization reactor is normally treated to deactivate any catalyst remaining in the solution. A variety of catalyst deactivators are known, examples of which include fatty acids, alkaline earth metal salts of aliphatic carboxylic acids, alcohols and trialkanolamines, an example of which is triisopropanolamine.

The hydrocarbon solvent used for the deactivator is preferably the same as the solvent used in the polymerization process. If a different solvent is used, it must be compatible with the solvent used in the polymerization mixture and not cause adverse effects on the solvent recovery system associated with the polymerization process.

After deactivation of the catalyst, the solution containing polymer may be passed through a bed of activated alumina or bauxite which removes part or all of the deactivated catalyst residues. It is, however, preferred that the process be operated without removal of deactivated catalyst residues. The solvent may then be flashed off from the polymer, which subsequently may be extruded into water and cut into pellets or other suitable comminuted shapes. The recovered polymer may then be treated with saturated steam at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants, UV screeners, hindered amine light stabilizers and other additives may be added to the polymer either before or after the polymer is initially formed into pellets or other comminuted shapes.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range of 0.1:1 to 5:1 with the total amount of antioxidant being in the range of 200 to 3000 ppm.

The process of the present invention may be used to prepare homopolymers of ethylene and copolymers of ethylene and higher alpha-olefins having densities in the range of, for example, about 0.900–0.970 g/cm$^3$ and especially 0.915–0.965 g/cm$^3$; the polymers of higher density, e.g. about 0.960 and above, being homopolymers. Such polymers may have a melt index, as measured by the method of ASTM D-1238, condition E, in the range of, for example, about 0.1–200, and especially in the range of about 0.1–120 dg/min. The polymers may be manufactured with narrow or broad molecular weight distribution. For example, the polymers may have a stress exponent, a measure of molecular weight distribution, in the range of about 1.1–2.5 and especially in the range of about 1.3–2.0. The process of the invention is believed to be particularly useful in the manufacture of broad molecular distribution polymers.

Stress exponent is determined by measuring the throughput of a melt indexer at two stresses (2160g and 6480g loading) using the procedures of the ASTM melt index test method, and the following formula:

$$\text{Stress exponent} = \frac{1}{0.477} \log \frac{(\text{wt. extruded with 6480g wt.})}{(\text{wt. extruded with 2160g wt.})}$$

Stress exponent values of less than about 1.40 indicate narrow molecular weight distribution while values above about 1.70 indicate broad molecular weight distribution.

The polymers produced by the process of the present invention are capable of being fabricated into a wide variety of articles, as is known for homopolymers of ethylene and copolymers of ethylene and higher alpha-olefins.

The process of the present invention is believed to be particularly advantageous in the preparation of broad molecular weight distribution polymers using an adiabatic tubular reactor, or a series of reactors.

Unless otherwise noted, in the examples hereinafter the following procedures were used:

The reactor was a 81 mL free-volume (regular internal shape, with the approximate dimensions of 15×90 mm) pressure vessel fitted with six regularly spaced internal baffles. The vessel was fitted with a six blade turbine-type impeller, a heating jacket, pressure and temperature controllers, three feed lines and a single outlet. The feed lines were located on the top of the vessel, each at a radial distance of 40 mm from the axis, while the outlet line was axial with the agitator shaft. The catalyst precursors and other ingredients were prepared as solutions in cyclohexane which had been purified by being passed through beds of activated alumina, molecular sieves and silica gel prior to being stripped with nitrogen.

Ethylene was metered into the reactor as a cyclohexane solution prepared by dissolving purified gaseous ethylene in purified solvent. The feed rates of the components of the catalyst were adjusted to produce the desired conditions in the reactor. The desired hold-up times in the catalyst line were achieved by adjusting the length of the tubing through which the components were passed. The hold-up time in the reactor was held constant by adjusting the solvent flow to the reactor such that the total flow remained constant. The reactor pressure was maintained at 7.5 MPa and the temperature and flows were held constant during each experimental run.

The initial (no conversion) monomer concentration in the reactor was 3–4 wt %. A solution of deactivator viz. triisopropanolamine or nonanoic acid, in toluene or cyclohexane was injected into the reactor effluent at the reactor outlet line. The pressure of the stream was then reduced to about 110 kPa (Abs.) and the unreacted monomer was continuously stripped off with nitrogen. The amount of unreacted monomer was monitored by gas chromatography. The catalyst activity was defined as Kp=(Q/(1−Q))(1/HUT)(1/catalyst concentration)

where Q is the fraction of ethylene (monomer) converted, HUT is the reactor hold-up time expressed in minutes and the catalyst concentration is the concentration in the reaction vessel expressed in mmol/l. The catalyst concentration is based on the sum of the transition metals. The polymerization activity (Kp) was calculated.

The present invention is illustrated by the following examples. Unless noted to the contrary, in each example the solvent used was cyclohexane, the monomer was ethylene and the reactor hold-up time was held constant at 3.0 min.

EXAMPLE 1

The catalyst was prepared by the in-line mixing at ambient temperature (approximately 30° C.) of solutions of each of dibutyl magnesium, triethyl aluminum, tert butylchloride and titanium tetrachloride in cyclohexane, followed by the addition of further solution of triethyl aluminum in cyclohexane. The concentrations and flows of each species were adjusted such that the following mole ratios were obtained:

chlorine (from tert butyl chloride)/magnesium =2.4;

magnesium/titanium =5.0;

aluminum (first triethyl aluminum)/titanium =0.9;

aluminum (second triethyl aluminum)/titanium =3.0.

The reactor polymerization was operated at a temperature of 230° C. measured in the reactor. The solution passing from the reactor was deactivated and the polymer recovered, as described above. Catalyst activity (Kp) was calculated and the results obtained are shown in Table 1. The ratios reported for Cl/Mg and Al$^2$/Mg are the optimized ratios required in order to obtain maximum catalyst activity at the indicated ratios of Mg/Ti and Al$^1$/Mg. In Run 2, the catalyst preparation was as above with the exception that one mole equivalent of tert butyl alcohol was added to the second aliquot of triethyl aluminum (thus forming the alkoxide).

TABLE I

| Run No. | Cl/Mg | Mg/Ti | Al$^1$/Ti | Al$^2$/Ti | Alcohol | Temp | Kp |
|---|---|---|---|---|---|---|---|
| 1 | 2.4 | 5.0 | 0.9 | 3.0 | none | 230 | 13.9 |
| 2 | 2.2 | 5.0 | 0.9 | 6.0 | t-butanol | 230 | 31.7 |
| 3 | 2.4 | 5.0 | 0.9 | 3.0 | t-butanol | 230 | 4.8 |
| 4 | 2.3 | 5.0 | 0.9 | 3.0 | phenol | 230 | 30.4 |
| 5 | 2.2 | 5.0 | 0.9 | 3.0 | ethanol | 230 | 24.9 |
| 6 | 2.3 | 5.0 | 0.9 | 4.5 | n-decanol | 230 | 24.1 |
| 7 | 2.2 | 5.0 | 0.9 | 3.0 | neopentyl alcohol | 230 | 29.3 |
| 8 | 2.3 | 5.0 | 0.9 | 6.0 | t-butanol[3] | 230 | 2.7 |

Note:
[1]ratio of triethyl aluminum to titanium at first addition.
[2]ratio of triethyl aluminum or alkoxydiethyl aluminum to titanium at second addition.
Kp calculated polymerization rate constant. 1/mmol/min.
[3]. t-butanol added to the reactor rather than to the catalyst.

Runs 1, 2 and 3 illustrate that the ratios of the catalyst components for the alkoxide systems have significant effects on the increase in activity, which is expected to vary with the type and composition of the other catalyst components and the mode of operation of the process but nonetheless illustrates that increases in catalytic activity of greater than a factor of two are obtainable. Run 3 cf. Run 2 illustrates sensitivity of the catalyst activity to changes in catalyst composition.

Runs 4, 5, 6 and 7 illustrate the use of alcohols other than tert butanol.

Run 8 illustrates the detrimental effect of the addition of the alcohol directly to the reactor, rather than to the second triethyl aluminum stream. This indicates that prior formation the alkoxydialkyl aluminum species is necessary.

EXAMPLE II

Catalyst were prepared as in Example I, except that in Runs 9–13 the triethyl aluminum at the second addition point was spiked with varying amounts of tert butyl alcohol, thus forming varying proportions of the t-butoxydiethyl aluminum (see Table II).

TABLE II

| Run No. | Cl/ Mg | Mg/ Ti | $Al^1$/ Mg | $Al^2$/ Mg | t-butanol/$Al^3$ | Temp | Kp |
|---|---|---|---|---|---|---|---|
| 9 | 2.2 | 5.0 | 0.9 | 6.0 | 0.0 | 230 | 5.2 |
| 10 | 2.2 | 5.0 | 0.9 | 6.0 | 0.2 | 230 | 6.7 |
| 11 | 2.2 | 5.0 | 0.9 | 6.0 | 0.4 | 230 | 9.6 |
| 12 | 2.2 | 5.0 | 0.9 | 6.0 | 0.6 | 230 | 13.7 |
| 13 | 2.2 | 5.0 | 0.9 | 6.0 | 0.8 | 230 | 19.7 |
| 12 | 2.2 | 5.0 | 0.9 | 6.0 | 1.0 | 230 | 31.7 |

Note:
[1]mole ratio of triethyl aluminum to titanium at first addition.
[2]mole ratio of triethyl aluminum or alkoxydiethyl aluminum to titanium at second addition.
[3]mole ratio of t-butanol to the second addition of triethylaluminum.

The results show that, at high temperature, increasing the proportion of the alkoxydialkyl aluminum relative to the trialkyl aluminum increases the activity of the catalyst.

EXAMPLE III

The catalyst was prepared from solutions of titanium tetrachloride, vanadium oxytrichloride and diethylaluminum chloride in cyclohexane. The admixed solutions were heat treated at 205°–210° C. for 110–120 seconds by admixing with hot cyclohexane solvent. The second co-catalyst (triethyl aluminum) previously mixed with n-decanol in the runs indicated was then added to activate the catalyst. The polymerization reactor was run at the temperature indicated in Table III. The solution passing from the reactor was deactivated and the polymer recovered as described above. The catalyst activity was calculated.

TABLE III

| Run No. | $Al^1$/(Ti + V) | $Al^2$/(Ti + V) | n-decanol$^3$ | Temp | Kp |
|---|---|---|---|---|---|
| 15 | 1.1 | 2.0 | none | 260 | 5.3 |
| 16 | 1.1 | 2.0 | 1.0 | 260 | 11.7 |
| 17 | 1.1 | 2.0 | none | 230 | 19.9 |
| 18 | 1.0 | 2.0 | 1.0 | 230 | 37.9 |
| 19 | 1.0 | 2.0 | none | 130 | 216 |
| 20 | 1.0 | 3.5 | 1.0 | 130 | 75 |

Note:
In each run, moles Ti/moles V = 1
[1]mole ratio of diethylaluminum chloride to the sum of the titanium and vanadium.
[2]mole ratio of the second co-catalyst (either triethyl aluminum or n-decoxydiethyl aluminum) to the sum of the titanium and vanadium.
[3]mole ratio of n-decanol to the second addition of triethylaluminum.

It will be noted that temperature has a major impact on the activity of the catalyst, which may be used in the control of the process.

EXAMPLE IV

The catalyst synthesis was the same as used in Example III with the exception that the n-decanol and the triethyl aluminum were mixed in-line in various ratios. A two-minute hold-up time was used at 30° C. before this solution was subsequently mixed with the heat treated catalyst stream. The reactor temperature was held constant at 130° C.

TABLE IV

| Run No. | $Al^1$/(Ti + V) | $Al^2$/(Ti + V) | n-decanol$^3$ | Temp | Kp |
|---|---|---|---|---|---|
| 21 | 1.0 | 2.0 | 0 | 130 | 216 |
| 22 | 1.0 | 2.0 | 0.5 | 130 | 126 |
| 23 | 1.0 | 2.0 | 0.9 | 130 | 73 |
| 24 | 1.0 | 2.0 | 1.0 | 130 | 15 |
| 25 | 1.0 | 2.0 | 1.1 | 130 | 3 |

Note:
In each run, moles Ti/moles V = 1
[1]mole ratio of diethylaluminum chloride to the sum of the titanium and vanadium.
[2]mole ratio of the second co-catalyst (either triethyl aluminum or n-decoxydiethyl aluminum) to the sum of the titanium and vanadium.
[3]mole ratio of n-decanol to the second addition of triethylaluminum.

It will be noted that, at low temperature, the addition of alcohol in any proportion results in a loss of activity as indicated in Table IV.

EXAMPLE V

The catalyst preparation was identical to that in Example IV, except that the autoclave was maintained at 260° C.

TABLE IV

| Run No. | $Al^1$/(Ti + V) | $Al^2$/(Ti + V) | n-decanol$^3$ | Temp | Kp |
|---|---|---|---|---|---|
| 26 | 1.1 | 2.0 | 0 | 260 | 5.3 |
| 27 | 1.1 | 2.0 | 0.5 | 260 | 9.6 |
| 28 | 1.1 | 2.0 | 0.9 | 260 | 12.6 |
| 29 | 1.1 | 2.0 | 1.0 | 260 | 18.5 |
| 30 | 1.1 | 2.0 | 1.1 | 260 | 13.3 |

Note:
[1]mole ratio of diethylaluminum chloride to the sum of the titanium and vanadium.
[2]mole ratio of the second co-catalyst (either triethyl aluminum or n-decoxydiethyl aluminum) to the sum of the titanium and vanadium.
[3]mole ratio of n-decanol to the second addition of triethylaluminum.

The results illustrated in Table V indicate that at high temperature, increased activity may be realized through the addition of alcohol to the above catalyst system.

We claim:

1. A process for the solution polymerization of high molecular weight polymers of alpha olefins selected from the group consisting of homopolymers of ethylene and copolymers of ethylene and $C_{3-12}$ alpha olefins at a temperature from 105° to 320° C. and a pressure from 4–20 MPa, said process comprising feeding to a tubular reactor kept under non-isothermal conditions or a series of reactors which operate under different conditions, monomer, selected from the group consisting of ethylene and mixtures of ethylene and at least one $C_{3-12}$ alpha olefin, a hydrocarbon solvent and a catalyst; wherein said catalyst is prepared by in-line mixing at a temperature of less than 30° C.:
  (i) a catalyst precursor prepared by the in-line mixing at a temperature of less than 30° C. of a mixture consisting of:
    (a) $MgR^1{}_2$ and $AlR^2{}_3$ wherein each $R^1$ and $R^2$ is the same or different and is a $C_{1-10}$ alkyl radical;
    (b) a reactive halide; and
    (c) titanium tetrachloride;
  to provide a molar ratio of halide to magnesium from 2.2 to 2.4; magnesium to titanium of 5; and aluminum to titanium of 0.9; with
  (ii) a catalyst activator prepared by in-line mixing at a temperature of less than 30° C. a composition consisting of:
    (d) a first component which is an aluminum alkyl of the formula $AlR_3$ wherein R is an alkyl radical of the 2–8 carbon atoms; with
    (e) an alcohol of the formula $R^4$ OH wherein $R^4$ is a $C_{1-20}$ alkyl radical in a ratio of alcohol to aluminum from 0.1 to 1.

* * * * *

UNITED STATES PATENT AND TRADEMARK OFFICE
CERTIFICATE OF CORRECTION

PATENT NO. : 5,589,555
DATED : Dec. 31, 1996
INVENTOR(S) : Zboril et al

It is certified that error appears in the above-indentified patent and that said Letters Patent is hereby corrected as shown below:

On the Title page, Item [*] Notice should be changed to read --

The term of this patent shall not extend beyond the expiration date of Pat. No. 5,519,098. --.

Signed and Sealed this

Fifteenth Day of April, 1997

Attest:

BRUCE LEHMAN

Attesting Officer   Commissioner of Patents and Trademarks